Patented Nov. 28, 1944

2,363,884

UNITED STATES PATENT OFFICE 2,363,884

LUBRICANT

Rush F. McCleary and John R. Morris, Beacon, N. Y., assignors to The Texas Company, New York, N. Y., a corporation of Delaware No Drawing. Application June 5, 1942, Serial No. 445,962

12 Claims. (Cl. 252—35)

This invention relates to a lubricant or lubricating composition containing a metal xanthate of an oil-soluble sulfurized phenolic composition obtained or derived from the Anacardium genus of the Anacardiaceae family.

The additive ingredients of the present invention are prepared from the extracted oils obtained from the Anacardium genus of the Anacardiaceae family and include the compositions and constituents of such oils as cashew nut shell oil, marking nut shell oil, Japanese lac, etc. It is the concensus of the authorities on these extracted oils that the chemical compositions thereof consist primarily of various types of aromatic derivatives such as anacardic acid ($C_{22}H_{32}O_3$), cardol ($C_{32}H_{52}O_4$), cardanol ($C_{20}H_{32}O$), anacardol ($C_{18}H_{30}O$) and urushiol ($C_{20}H_{30}O_2$).

The phenolic compositions to which this invention applies are those oil-soluble phenols which exist in the naturally occurring Anacardium oils or are formed by the decomposition of other aromatic derivatives present in the oils. These oil-soluble phenols are usually mono- or di-hydric phenols possessing long chain unsaturated alkyl groups attached to the nucleus.

The naturally occurring cashew nut shell oil is described as containing approximately 90% anacardic acid and 10% cardol. Neither of these constituents are applicable to the present invention in that the anacardic acid fraction contains a carboxylic group and the cardol fraction, while described as a phenolic composition, is relatively oil-insoluble.

The commercially available cashew nut shell oil which is obtained by a thermal extraction process consists primarily of a mixture of anacardic acid, cardanol and cardol with cardanol predominating. The cardanol fraction which does not appear in the naturally occurring oil is presumed to be a degradation product of anacardic acid and the amounts of cardanol present in the commercial oil depends upon the degree of heat used in the extraction process. Upon distillation of the commercial cashew nut shell oil, an oil-soluble distillate is obtained which consists almost entirely of cardanol. Cardanol distills over as an oil-soluble light-colored liquid at approximately 225° C. and 10 mm. mercury and is described as a phenol possessing an unsaturated alkyl radical of 14 carbon atoms in the meta position. This compound is very unstable and upon heating forms condensation and polymerization products together with co-polymers.

In addition to the cardanol, the distillate obtained contains a lower boiling fraction possessing a nicotine-like odor which rapidly darkens when exposed to the atmosphere. This fraction, which amounts to about 5% of the original oil, contains approximately 0.64% nitrogen. If desired, this lower boiling fraction may be removed by fractional distillation.

The following physical constants were obtained on two distillates of the commercially available thermal extracted cashew nut shell oil, one being obtained by vacuum distillation at 10 mm. mercury (A), and the other by steam distillation at atmospheric pressure (B).

|  | A | B |
|---|---|---|
| Bromine No | 135 | 118 |
| Hydroxyl No | 183 | 181 |
| Neutralization No | 6 | 3.5 |
| Saponification No |  | 8.4 |
| Per cent sulfur | 0.10 | 0.10 |

It has been discovered that the addition of small quantities of an oil-soluble or oil-miscible metal xanthate of an oil-soluble sulfurized phenolic composition obtained or derived from the Anacardium genus of the Anacardiaceae family to a refined hydrocarbon oil provides a lubricant, or a compounding lubricant, possessing enhanced anti-oxidant and anti-corrosive properties, together with a lowered pour point. These oil-miscible metal xanthates may be incorporated in any refined hydrocarbon oil which is normally subject to oxidation conditions during service. Among these hydrocarbon oils which may be improved are the petroleum lubricating oils such as motor, Diesel, turbine and aviation oils and the refined hydrocarbon oils used in the preparation of industrial lubricants, greases, textile oils, etc.

These oil-soluble metal xanthates may be incorporated in a hydrocarbon oil in amounts varying between 0.01 to 5.0% by weight of the finished lubricant. The particular proportions used depend upon the type of lubricant to be improved, the service for which the lubricant is intended, and the degree of improvement desired in the hydrocarbon oil. The preferred range of proportions in a mineral lubricating oil when used in a few of the more common services are as follows:

|  | Per cent by weight of finished lubricant |
|---|---|
| Diesel lubricating oil | 0.5 –2.5 |
| Motor lubricating oil | 0.3 –3.0 |
| Heavy duty lubricating oil | 0.5 –3.0 |
| Turbine lubricating oil | 0.01–0.1 |
| Airplane lubricating oil | 0.5 –2.0 |

The particular metals which may be used to form the metal derivatives of the present invention include any of the following metals: sodium, potassium, lithium, calcium, barium, strontium, tin, bismuth, aluminum, zinc, magnesium, cadmium, lead, titanium, antimony, chromium, manganese, iron, cobalt, nickel and copper, with reference given to the alkaline earth metals and tin and zinc.

In preparing the sulfurized metal xanthates of the present invention it has been found preferable to first sulfurize the unsaturated constituents of the phenolic compositions, then prepare the metal salt thereof and finally react the metal salt of the sulfurized phenol with carbon disulfide under pressure. This particular sequence of reactions is not critical to the preparation of these compositions and any of the classical methods of synthesis may be used which will result in the compounds herein described.

In all of these reactions particular care must be taken to avoid the polymerization and condensation reactions characteristic of these phenols. It has been found that by partially hydrogenating the unsaturated alkyl radicals, these undesirable reactions are avoided and the partially hydrogenated product is sufficiently stable to proceed with any of the foregoing reactions. These hydrogenation reactions do not completely hydrogenate the unsaturated alkyl radical and a sufficient degree of unsaturation is left which enables the composition to take on sulfur in the sulfurization reaction.

The following example illustrates one of the methods of preparing the sulfurized metal xanthates of the present invention:

EXAMPLE 400 ccs. of cardanol with a bromine number of 104–105 was partially hydrogenated in an Adkins type hydrogenation bomb using a Raney nickel catalyst under 2000 pounds pressure. The resulting partially hydrogenated cardanol analyzed as follows:

Bromine No._____ 64–65
Hydroxyl No._____ 182–177
Per cent sulfur_____ None

To 285 grams of the partially hydrogenated cardanol were added 315 grams of 300 Pale oil and 28 grams of elemental sulfur. The mixture was heated with stirring at 150–160° C. for six hours and then cooled. To 314 grams of the concentrate of the sulfurized partially hydrogenated cardanol in the Pale oil were added 50 grams of barium hydroxide and 300 ccs. of toluene. This mixture was refluxed under an automatic water separator until no more water came off and then cooled, filtered and the solvent removed by stripping.

This product which was a 50% concentrate of barium salt of sulfurized partially hydrogenated cardanol in Pale oil analyzed as follows:

Per cent barium_____ 9.9–10.0
Per cent sulfur_____ 3.4

325 grams of the concentrate were charged to a bomb with 325 ccs. of carbon disulfide. The bomb was heated to 110–120° C. under a pressure of 75 pounds per sq. in. for 1½ hours after which the heat was cut off and the bomb rocked for seven hours. The contents of the bomb were then cooled, washed out with carbon disulfide and stripped of solvent. The analysis of the resulting barium xanthate of sulfurized partially hydrogenated cardanol in a 50% concentrate of 300 Pale oil was as follows:

Per cent barium_____ 10.0–10.2
Per cent sulfur_____ 7.0

The effectiveness of the compositions of the present invention as improving agents for lubricants was demonstrated by empirical tests, together with tests in actual automotive engines. The following empirical test was designed to illustrate the anti-oxidant or anti-corrosive properties of the additive ingredient in a lubricating oil. This test consists of a copper-lead bearing specimen encased in a special non-wearing bushing, rotatively mounted on a stainless steel shaft and immersed in a glass pot of the oil to be tested. Both fine structure and coarse structure copper-lead bearing specimens were used. The oil was heated to a controlled temperature of either 250° F. or 350° F. and continuously circulated between the bearing specimen and the shaft for 10 hours. Throughout the test the oil was continuously agitated by means of copper baffles which acted as oxidation accelerators. The bearing specimen was weighed before the test and after the 10-hour period and the loss of weight recorded in milligrams. The reference oil of this test was a solvent refined, dewaxed, Mid-Continent lubricating oil of an SAE 30 grade. The following results were obtained on the uninhibited reference oil and the reference oil compounded with the composition prepared in the foregoing example:

BEARING CORROSION—COPPER-LEAD (10 HOURS)

*Loss of weight—mgs.*

350° F.
Reference oil_____ 284
Reference oil 1.0% barium xanthate of sulfurized partially hydrogenated cardanol___ 57

As an indication of the degree of oxidation of the various samples during the foregoing test, the used oil of each sample was tested to determine the increase in neutralization number. The following are a comparison of the results:

| | Neut. No. before test | Neut. No. after test |
|---|---|---|
| Reference oil | 0.03 | 11.6 |
| Reference oil +1.0% barium xanthate of sulfurized partially hydrogenated cardanol | 1 0.21 | 1.12 |

1 Alkaline.

To indicate the pour depressant properties of the compounds of the present invention, 1.0% of the barium xanthate of sulfurized partially hydrogenated cardanol prepared in accordance with the foregoing example was compounded with a base oil which was a solvent refined, dewaxed, Mid-Continent lubricating oil of SAE 30 grade which possessed a pour point of 0° F. The pour point of the compounded oil was determined on two samples as being —10° F. and —20° F.

The test in an automotive engine was run in a standard Chevrolet engine operated on a block for 40 hours at 2500 R. P. M. and 50 M. P. H. or an equivalent of 2000 miles with a crankcase oil temperature of 275° F. and jacket temperature of 212° F. with a crankcase ventilation of one cubic foot of air per minute. The test was stopped at a 10-hour period and started immediately. At 20 hours, the engine was stopped and rested for four hours. At 30 hours, the engine was again stopped and rested for four hours. At 40 hours, the test was terminated, the engine was taken down, the pistons removed and the amount of varnish deposit determined on the oil rings and piston skirt. This was accomplished in each case by washing first with precipitation naphtha to remove the retained oil, then washing with acetone to remove the bulk of the varnish deposit. The acetone solution was then evaporated to dryness and the residue extracted with precipitation naphtha to remove the remaining traces of oil. The residue was again taken up in an acetone solution and filtered to remove suspended deposits and finally evaporated to dryness.

The following results were obtained on an uninhibited reference oil which was a solvent refined, dewaxed, Mid-Continent lubricating oil of an SAE 30 grade, together with said oil, containing the barium xanthate of sulfurized partially hydrogenated cardanol:

|  | Visual piston varnish | Piston skirt varnish, mgs. | Ring varnish, mgs. | Under piston deposit, mgs. |
|---|---|---|---|---|
| Reference oil | Medium | 615 | 885 | 7,383 |
| Reference oil+1.0% barium xanthate of sulfurized partially hydrogenated cardanol | Clean+ | 131 | 106 | 695 |
| Reference oil | Medium | 754 | 1,066 | 6,107 |

The hydrocarbon oils to which the oil-soluble metal derivatives of the present invention are added may be either in the crude form or partially or highly refined and may contain other additive ingredients such as dyes, metal soaps, pour depressants, thickeners, V. I. improvers, oiliness agents, extreme pressure agents, sludge dispersers, oxidation inhibitors, and corrosion inhibitors such as sulfurized hydrocarbons, etc.

Obviously many modifications and variations of the invention, as hereinbefore set forth, may be made without departing from the spirit and scope thereof and, therefore, only such limitations should be imposed as are indicated in the appended claims.

We claim:

1. A lubricant comprising a hydrocarbon oil and a small proportion, sufficient to impart anti-oxidant properties to said oil, of an oil-miscible metal xanthate of an oil-soluble sulfurized phenolic composition derived from the oils extracted from the Anacardium genus of the Anacardiaceae family.

2. A lubricant comprising a petroleum lubricating oil and a small proportion, sufficient to impart anti-oxidant properties to said oil, of an oil-miscible metal xanthate of an oil-soluble sulfurized phenolic composition derived from the oils extracted from the Anacardium genus of the Anacardiaceae family.

3. A lubricant comprising a hydrocarbon oil having incorporated therein 0.01–5.0% by weight of an oil-miscible metal xanthate of an oil-soluble sulfurized phenolic composition derived from the oils extracted from the Anacardium genus of the Anacardiaceae family.

4. A lubricant comprising a hydrocarbon oil and 0.01–5.0% by weight of an oil-miscible metal xanthate of an oil-soluble sulfurized partially hydrogenated phenolic composition derived from the oils extracted from the Anacardium genus of the Anacardiaceae family.

5. A lubricant comprising a hydrocarbon oil having incorporated therein 0.01–5.0% by weight of an oil-miscible alkaline earth metal xanthate of an oil-soluble sulfurized phenolic composition derived from the oils extracted from the Anacardium genus of the Anacardiaceae family.

6. A lubricant comprising a hydrocarbon oil having incorporated therein 0.01–5.0% by weight of an oil-miscible alkaline earth metal xanthate of sulfurized cardanol.

7. A lubricant comprising a hydrocarbon oil having incorporated therein 0.01%–5.0% by weight of an oil-miscible tin xanthate of an oil-soluble sulfurized phenolic composition derived from the oils extracted from the Anacardium genus of the Anacardiaceae family.

8. A lubricant comprising a hydrocarbon oil having incorporated therein 0.01–5.0% by weight of an oil-miscible zinc xanthate of an oil-soluble sulfurized phenolic composition derived from the oils extracted from the Anacardium genus of the Anacardiaceae family.

9. A lubricant comprising a mineral lubricating oil having incorporated therein 0.01–5.0% by weight of an oil-miscible metal xanthate of an oil-soluble sulfurized phenolic composition derived from cashew nut shell oil.

10. A lubricant comprising a mineral lubricating oil having incorporated therein 0.01–5.0% by weight of an oil-miscible metal xanthate of an oil-soluble sulfurized partially hydrogenated phenolic composition derived from cashew nut shell oil.

11. A lubricant comprising a mineral lubricating oil having incorporated therein 0.01–5.0% by weight of an oil-miscible metal xanthate of sulfurized cardanol.

12. A lubricant comprising a mineral lubricating oil having incorporated therein 0.01–5.0% by weight of an oil-miscible metal xanthate of sulfurized partially hydrogenated cardanol.

RUSH F. McCLEARY.
JOHN R. MORRIS.